United States Patent Office 3,408,867
Patented Nov. 5, 1968

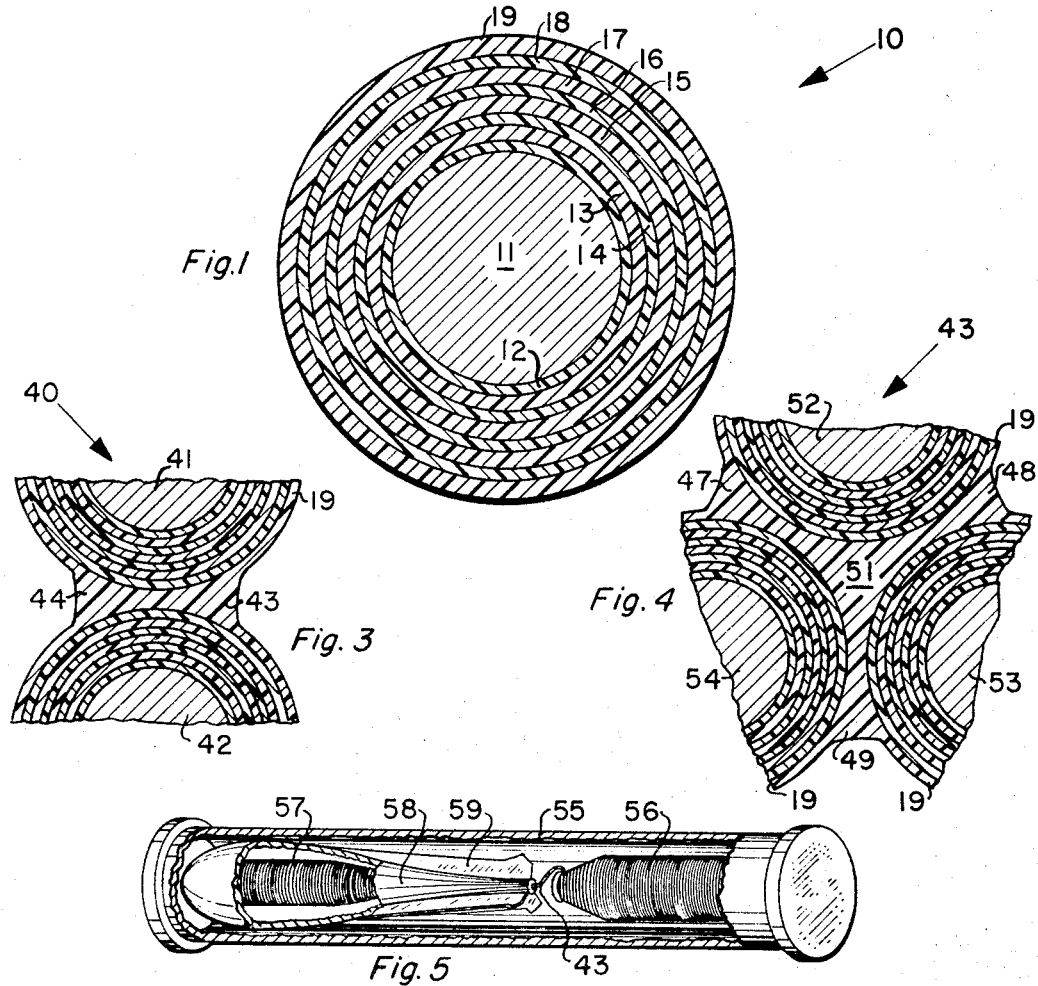
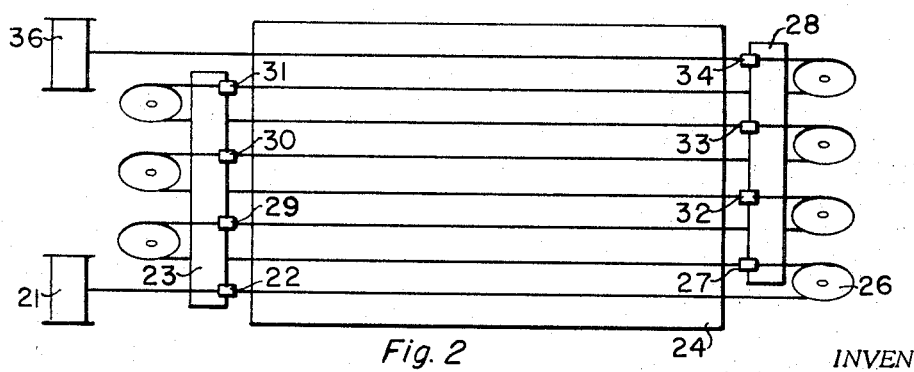

3,408,867
TEMPERATURE MEASURING SEA WATER PROBE, INSULATED WIRE SUITABLE THEREFOR AND METHOD OF MAKING SAME
Charles G. Henricks and William C. Le Mieux, Muskegon, Mich., assignors to Anaconda Wire and Cable Company, a corporation of Delaware
Filed Oct. 10, 1966, Ser. No. 585,430
9 Claims. (Cl. 73—339)

ABSTRACT OF THE DISCLOSURE

An apparatus for measuring the temperature of sea water has two spools encased in a probe. The spools are interconnected with a wire having a number of alternate insulating layers of epoxy enamel and nylon. Each layer of insulation is formed on the wires by a single pass.

---

Our invention relates to fine wire and particularly to wire coated with multiple alternate layers of epoxy and nylon enamel.

Fine wires for use in submerged locations are subjected to particularly severe hazards in that any defect in the coating, such as a crack that may occur when the wire is stretched, will result in immediate faulting. The wire insulation is subject also to the crazing and corrosive effect of the water wherein it is immersed, particularly when it is immersed in salt water. We have now invented a wire that will retain its electrical properties when submerged, even though, due to its small size, the wire may be particularly liable to stretching. We have also invented an improved multiconductor strand that can be despooled at exceeding high speeds without breaking, snarling, or abrading the wire insulation.

The wire of our invention has a metal conductor, preferably, and particularly for small gage sizes, a copper conductor, coated with a plurality of directly contiguous alternate layers of epoxy and nylon enamel. The layer directly over the conductor should be epoxy since this material adheres well to copper and other metals and it is preferable that the outer layer be nylon which has superior resistance to water crazing, but it is a feature of our invention that wo layers alone are not sufficient to produce the desired advantage. This is due, possibly to the fact that if only an inner epoxy layer and an outer nylon layer are applied each of these layers must; in order to achieve the necessary over-all dielectric strength, be too thick to produce a synergistic result that we have discovered will ensue when multiple thin alternate layers are applied.

Our wire, which has outstanding dielectric properties when immersed in water, comprises a fine metallic conductor, a plurality of contiguous double-layered walls of enamel surrounding the conductor, each of the double-layered walls comprising a layer of cured epoxy and a directly contiguous layer of thermoplastic nylon. Preferably the innermost layer is epoxy and the outermost layer is nylon, with the average thickness of the layers not exceeding 0.0002 inch.

In the method of insulating our wire we cover a fine conductor by which we mean a conductor no larger than about 30 AWG with a single liquid coating of epoxy enamel and pass it through an oven to cure the enamel. Then we directly cover the conductor with an additional single coating of nylon dissolved in solvent and pass it through the oven to evaporate the solvent. This process of applying alternate single coatings of epoxy and nylon is repeated until a sufficient wall thickness of insulation has been applied to prevent the wire from short circuiting when it is immersed in water and an electrical potential applied to the conductor. This thickness is preferably at least about 0.0009 inch.

The outer nylon layer, being thermoplastic, can be used to bond a plurality of wires together, and our invention also comprises a plurality of wires each comprising a plurality of contiguous double-layered walls of insulation comprising a layer of cured epoxy and a layer of thermoplastic nylon with the wires bonded together by means of webs of the outer nylon layer.

Particularly, in the manufacture of submarine temperature measuring apparatus of the type having two spools of interconnected multiple wire strands, one of said spools being encased in a probe structure, the improvement comprising said strands being comprised of a plurality of wires each comprising a plurality of contiguous double-layered walls of insulation comprising a layer of cured synthetic resin and a layer of thermoplastic resin with the wires laid parallel and bonded together by means of the outer thermoplastic layer.

The enamels we use in the practice of our invention are both commercially available. The epoxy is the reaction product of epichlorohydrin and a polyhydric monomer cured with urea formaldehyde, melamine formaldehyde or phenol formaldehyde resins. The epoxy resin that we have found particularly satisfactory is the reaction product of epichlorohydrin with p,p-isopropylidenediphenol, known as Bisphenol A and cured with an amine agent. These resins are sold by the Jones-Dabney Company, division of Devoe & Raynolds Company, Inc. under the trade name Epi Rez.

Nylon is known to commerce in different modifications such as that obtained by the polycondensation of caprolactam, the condensation of hexamethylene diamine with sebacic acid, and the condensation of hepamethylene diamine with adipic acid. We prefer to use the latter composition known as nylon 66 in a molecular weight of about 13,000 but any of the commercial nylons that can be applied in solution can be used in the practice of our invention.

A more thorough understanding of our invention will be gained from a study of the appended drawing.

In the drawing:
FIGURE 1 shows a section of wire made to our invention, with the enamel thicknesses greatly exaggerated.
FIGURE 2 shows a symbolic plan view of the steps in the process of our invention.
FIGURE 3 shows partial section of a 2-wire strand of our invention.
FIGURE 4 shows a partial section of a 3-wire strand of our invention.
FIGURE 5 shows an apparatus incorporating the wire of our invention.

In FIGURE 1 a wire indicated generally by the numeral 10 has a copper conductor 11 covered immediately by a layer of epoxy 12. Although we have shown the wire 10 having a copper conductor it will be understood that other metals such for example as aluminum may also be used although copper has most utility for the very fine wires in sizes 30–42 AWG for which our invention has found its greatest commercial market. We have also shown the innermost layer 12 to be epoxy rather than nylon. Since epoxy bonds very well to metals, and particularly copper, this order of application is much to be preferred. Above the layer 12 there is a layer 13 of nylon and thereafter there are layers 14, 16, 18 of epoxy alternating with layers 15, 17, 19 of nylon each of the layers being contiguous with the layer beneath it in the sense that the layers are in direct actual contact, with no interposing material. It is preferred that the outer layer 19 should be of nylon rather than epoxy because of the freedom from crazing of nylon in salt water, and because, as shall be discussed, the nylon can be fused to form a plurality of wires into a strand. There may, as an alternative, be some superficial coating such as a cement coating external to the layer 19 for the purpose of bonding bundles of wire together but the direct fusing of the nylon outerlayer has the advantage that the single layer serves the dual purpose of insulating and cementing the wires. The double wall thickness of the eight layers 12–19 is only about 2 mils or less in applied examples of our invention so that the individual layer thicknesses are extremely light.

As we will describe more fully hereinbelow, the wire of our invention has particular application for apparatus wherein it is connected to a sensing element, such as a temperature sensing element, and for this purpose a 2-conductor or 3-conductor strand may be required. By making the outermost coating 19 nylon we are enabled to form multiconductor strands such as the 2-wire strand of FIGURE 3 and the 3-wire strand of FIGURE 4. In the 2-wire strand indicated generally by the numeral 40 two wires 41, 42 have been bonded together in parallel relationship by webs 43, 44 of nylon formed by fusing the outer layers 19—19. It should be noted that the sections of the webs 43, 44 are solid and that a degree of stiffness is thus imparted to the strand that greatly facilitates the process of despooling and prevents entanglements. Similarly in a 3-wire strand 46 webs 47, 48, 49 and a central web 51 are formed from the outer nylon layers 19—19 of wires 52, 53, 54. The wires 52, 53, 54 are not formed into a helix but are laid substantially parallel. A flat arrangement of 3 conductors with one conductor between the other two can also be utilized within the scope of our invention.

In FIGURE 5 the strand 43 is shown wound on an apparatus 55 comprising two spools 56, 57 the latter of which is encased in a probe structure 58 having a generally tear-drop shape with vanes 59 which prevent it from tumbling during descent. Apparatus of the type described is manufactured by The Sippican Corporation of Marion, Mass., as their T-4 Expendable Bathythermograph Probe. In use on a ship the spool 56 remains with the vessel and pays off strand as the vessel advances while the probe 58 which contains the sensing device (not shown) descends vertically into the ocean. An end of the strand 43 is connected to suitable recording apparatus on board ship.

The manufacture of magnet wire by solution coating is very widely practiced commercially, the overwhelming bulk of magnet wire being produced by this method. In the practice of this method the thinnest wall of commercial insulation still comprises multiple coats usually in absolute minimum of 4 coats, 12 coats being not uncommon. A single coating applied by this method has always been too thin and too spotty to function as a dielectric barrier although single coats are sometimes applied over an insulated wire to serve as a cement or colorant. It has been known to apply dual thicknesses of different enamel insulations to magnet wire such as that described in the Olson and Arndt Patent 3,240,626. But when this has been done the thickness of each of the different enamel layers has been comprised of a plurality of single-pass coats. It is a feature of the present invention that the thickness of the individual layers is preferably reduced to the thickness of a single coat or pass on the enamelling machine. Due, possibly, to differences in volume solubility the nylon layers are somewhat thicker than the epoxy layers but, in order to achieve the desired synergistic effect of the double layers, the average individual layer thickness should not exceed about 0.0002 inch.

In the symbolic representation of FIGURE 2 the conductor 11 is being paid from a supply reel 21 through an applicator die 22 where it is coated with epoxy enamel from a tank 23, whence it passes through an oven 24 where the enamel is cured in a known manner. The thickness that can be applied at the die 22 is more-or-less fixed by the viscosity and surface tension of the liquid enamel and the thickness of the cured enamel emerging from the oven 24 is determined also by the volume change upon curing. Particularly in consideration of the need for concentricity of coating only a very thin layer can be applied in any one pass. The wire leaving the oven 24 is reversed in direction by a sheave 26 whence it receives a coating of nylon at the applicator die 27 supplied from a tank 28. The wire passes back through the oven 24 where the nylon solvent is evaporated. The operation is continued with the wire receiving epoxy coating at dies 29, 30, 31 and nylon coatings at dies 32, 33, 34. We have shown single elongated tanks 23, 28 for each of the two enamel solutions, and it is an advantage of our method that two tanks can be made to suffice but a separate tank might be used for each of the dies 22, 27, 29–34 within the scope of our invention. After its final pass through the oven from the die 34 the wire 10 is taken up on a reel 36 driven in a conventional manner by means not shown. It will be understood that the illustrated process comprises a method of our invention but that further processing such as the application of a cement coat or additional dry passes through the oven might be taken within the scope of our method.

In the application of our method the enamels are applied as liquids, the nylon being dissolved in a suitable solvent such as cresylic acid for this purpose. The epoxy is also dissolved in a solvent along with its curing agent such as tetraethylenepentaamine, although epoxy enamels which are normally liquids can also be used within the scope of our invention. Suitable enamels are formulated as follows:

Epoxy enamel

|  | Percent by weight |
|---|---|
| WES oil [1] | 26.85 |
| Diacetone alcohol | 21.15 |
| Epi Rez 560 [2] | 14.50 |
| Cresylic acid | 24.10 |
| Beetle 227-8 [3] | 12.17 |
| Polyvinyl acetal resin | 1.23 |

Nylon enamel

| | |
|---|---|
| Nylon 66 | 18 |
| Phenol | 82 |

[1] A hydrocarbon solvent supplied by the Barrett Division of Allied Chemical Corporation and having a boiling range of 165–220° C.
[2] An epichlorohydrin, bisphenol A epoxy resin having a melting point of 165–180° C., weight per epoxide of 4000–6000 and viscosity of 40% solution in butyl carbitol at 77° F. (cps.) of >16,000, suplied by the Jones-Dabney Company.
[3] A butylated ureaformaldehyde resin supplied by the American Cyanamid Company.

EXAMPLE

In order to compare the performance of our wire under water, samples were prepared with 30-inch lengths immersed in salt water. The insulation resistance of the immersed lengths was measured while the conductors were elongated. The percent elongation of the conductor when the insulation resistance (I.R.) had dropped to 10 megohms was recorded as a measure of underwater performance. The greater the elongation before loss of I.R. the better the wire. Samples A, B, and C were made in accordance with this invention in sizes 39, 37, and 40 AWG respectively. Each of the samples A, B, and C comprised 6 specimens for testing, having a 0.0009 inch wall thickness of insulation comprised of 8 alternate epoxy-nylon layers. Samples D, E, F, and G comprised 14, 9, 4, and 4 specimens respectively of quadruple coated epoxy wire having a wall thickness of about 0.0006 inch. The epoxy used in each specimen of this example was the same formulation and all the conductors were copper. Samples D, E, and F were size 40 AWG and sample G was size 39 AWG. Sample H was comprised of 12 specimens of a size 40 AWG conductor with a 0.0006-inch wall comprised of a multi layer coating of epoxy covered with nylon. The results of the test are shown in the table.

TABLE

| Sample: | Elongation at failure, percent |
|---|---|
| A | 22.2 |
| B | 32 |
| C | 24.3 |
| D | 2 |
| E | 3.7 |
| F | 1 |
| G | 1 |
| H | 8.6 |

In the case of samples A, B, and C coated in accordance with our invention the loss of I.R. coincided with the breaking of the conductor.

We have invented a new and useful article and method for which we desire an award of Letters Patent.

We claim:

1. A fine wire having outstanding dielectric properties when submerged in water comprising:
   (A) a fine metallic conductor,
   (B) a plurality of contiguous double-layered walls of enamel surrounding said conductor,
   (C) each of said double-layered walls comprising a layer of cured epoxy and a contiguous layer of thermoplastic nylon.

2. The wire of claim 1 wherein the innermost layer is epoxy.

3. The wire of claim 1 wherein the outermost layer is nylon.

4. The wire of claim 1 wherein the average thickness of one of said layers does not exceed about 0.0002 inch.

5. A strand comprising a plurality of the wires of claim 1 bonded together by means of webs of the outermost of said nylon layers.

6. In a submarine temperature measuring apparatus of the type having two spools of interconnected multiple-wire strands, one of said spools being encased in a probe structure, the improvement comprising:
   (A) said strands being comprised of a plurality of wires each comprising a conductor and a plurality of contiguous double-layered walls of enamel surrounding said conductor,
   (B) each of said double-layered walls comprising an inner layer of cured resin and an outer layer of thermoplastic resin, and
   (C) the average thickness of said layers not exceeding about 0.0002 inch.

7. The improvement of claim 6 wherein said strands comprise a plurality of wires bonded together by longitudinal webs of the outermost of said thermoplastic resin layers.

8. The method of insulating a fine wire to have outstanding electrical properties when immersed in water comprising the steps of:
   (A) covering a conductor with a single liquid coating of epoxy enamel from a supply of said enamel,
   (B) heating said conductor in an oven and thereby curing said enamel,
   (C) directly covering said enamel on said conductor with a single coating of nylon dissolved in solvent from a supply of said nylon dissolved in solvent,
   (D) heating said conductor in an oven and thereby evaporating said solvent,
   (E) repeating said single coatings of epoxy and nylon from said supplies and repeating said respective curing and solvent evaporation until a sufficient wall thickness of insulation has been applied to said conductor to prevent short circuiting when said magnet wire is immersed in water and an electrical potential applied to said conductor.

9. The method of claim 8 wherein said wall thickness is not less than about 0.0009 inch.

References Cited

UNITED STATES PATENTS

| | | | |
|---|---|---|---|
| 2,085,995 | 7/1937 | Patnode | 117—218 |
| 3,179,634 | 4/1965 | Edwards. | |
| 3,220,882 | 11/1965 | Lavin | 117—218 |
| 3,221,556 | 12/1965 | Campbell. | |

FOREIGN PATENTS 163,879  5/1958  France.

LEWIS H. MYERS, *Primary Examiner.*

E. GOLDBERG, *Assistant Examiner.*